Figure 1:
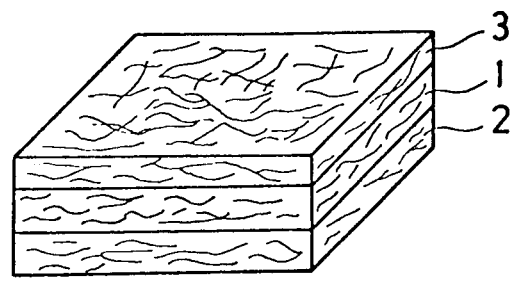

United States Patent [19]

Fukuda et al.

[11] 4,181,513

[45] Jan. 1, 1980

[54] CARBON ADSORPTIVE FILTER MATERIAL WITH LAYERS OF REINFORCING NON WOVEN FABRICS NEEDLE PUNCHED

[75] Inventors: Takashi Fukuda; Masayoshi Shimada; Nobuo Ishizaki; Shoichi Iwahori, all of Otsu, Japan

[73] Assignee: Toyobo Co., Ltd., Osaka, Japan

[21] Appl. No.: 790,982

[22] Filed: Apr. 26, 1977

Related U.S. Application Data

[63] Continuation of Ser. No. 561,231, Mar. 24, 1975, abandoned.

[30] Foreign Application Priority Data

Nov. 5, 1974 [JP] Japan .............................. 49-134177[U]

[51] Int. Cl.$^2$ ........................................... B01D 46/02
[52] U.S. Cl. ........................................ 55/316; 55/382; 55/486; 55/497; 55/521; 55/524; 55/527; 55/528; 252/421; 423/447.1
[58] Field of Search ...................... 423/447.1; 252/421; 55/316, 486, 487, 527, 528, 521, 524, 382, 497

[56] References Cited

U.S. PATENT DOCUMENTS

| 101,830 | 4/1870 | Crump | 55/378 |
|---|---|---|---|
| 2,933,154 | 4/1960 | Lauterbach | 55/97 |
| 3,053,775 | 9/1962 | Abbott | 55/528 |
| 3,514,643 | 5/1970 | Tarala | 55/497 |
| 3,850,785 | 11/1974 | McQuade et al. | 55/527 |
| 3,944,403 | 3/1976 | Simpson et al. | 55/316 |

FOREIGN PATENT DOCUMENTS

| 1301101 | 12/1972 | United Kingdom | 55/527 |
|---|---|---|---|
| 1376888 | 12/1974 | United Kingdom | 55/316 |

*Primary Examiner*—Bernard Nozick
*Attorney, Agent, or Firm*—Birch, Stewart, Kolasch and Birch

[57] ABSTRACT

An adsorptive filter material having deodorizing, degassing and decolorizing properties which comprises an adsorptive sheet layer of active carbon fibers of which the active carbon fiber content is not less than about 20% by weight and reinforcing sheet layers of fibers having a single yarn strength of not less than about 2 g/denier and an elongation of not less than about 2% provided on the surfaces of the adsorptive sheet layer, the adsorptive sheet layer and the reinforcing sheet layers each weighing from about 20 to 2,000 g/m$^2$.

19 Claims, 4 Drawing Figures

CARBON ADSORPTIVE FILTER MATERIAL WITH LAYERS OF REINFORCING NON WOVEN FABRICS NEEDLE PUNCHED

This application is a continuation of copending application Ser. No. 561,123, filed on Mar. 24, 1975, now abandoned.

The present invention relates to an adsorptive filter material. More particularly, it relates to an adsorptive filter material having deodorizing, degassing and decolorizing properties, which comprises an adsorptive sheet layer of active carbon fibers and a reinforcing sheet layer of fibers.

Filters for purification, which are intended to eliminate various harmful gases or odors from air or to remove colored materials in industrial waste water, have been used widely, especially because in recent years environmental problems have come to be seriously considered. The filters of this kind are usually in a sheet form made by coating a sheet material such as wire nets, glass wools or organic fiber mats with an adsorbent such as active carbon, active china clay or silica gel. However, the adsorbing capacity of the adsorbent is disadvantageously lowered as the result of such coating treatment. Further, scaling-off of the adsorbent often happens so that dusts are produced to cause harmful influences. In addition, the amount of the adsorbent retainable in the sheet material is considerably limited.

As the result of an extensive study for overcoming these drawbacks, there has now been provided an adsorptive filter material which comprises an adsorptive sheet layer of active carbon fibers of which the active carbon fiber content is not less than about 20% by weight and a reinforcing sheet layer of fibers having a single yarn strength of not less than about 2 g/denier and an elongation of not less than about 2% provided on at least one surface of the adsorptive sheet layer, the adsorptive sheet layer and the reinforcing sheet layer each weighing from about 20 to 2,000 g/m$^2$.

The adsorptive sheet layer of the adsorptive filter material according to the present invention comprises active carbon fibers as the adsorbent. The term "active carbon fibers" herein used is intended to mean carbon fibers having an activity corresponding to an iodine ($I_2$) adsorptive amount of not less than about 200 mg/g. Such active carbon fibers may be prepared using any conventional carbon source such as natural or regenerated cellulose fibers, pulp, polyacrylonitrile fibers, pitch or lignin by any conventional procedure. Some typical procedures are those as described in Japanese Patent Publication No. 12376/1963 and British Pat. No. 1,301,101.

The active carbon fibers possess a more excellent adsorbing capacity than conventional pelletized active carbons. For instance, the adsorption rate of the former is about 10 to 1000 times that of the latter, and the equilibrated adsorption amount of benzene of the former is much higher than that of the latter. The active carbon fibers used in this invention are usually desired to be not less than about 300 mg/g (preferably not less than about 400 mg/g) in equilibrated adsorption amount of benzene and not less than about 0.2/minute in adsorption rate constant of benzene.

The active carbon fibers are used in a sheet form, which may be either a woven one or non-woven one. The sheet form may be constructed by the active carbon fibers alone but, in order to reinforce the mechanical strength and the elongation, it is often preferred to use the active carbon fibers and any other organic and/or inorganic fibers (e.g. rayon fibers, polyester fibers, polyamide fibers, glass fibers, metal fibers) in admixture or combination. For instance, the active carbon fibers may be admixed with the other organic and/or inorganic fibers, preferably in an amount of not more than about 80% by weight on the basis of the combined amount, and shaped in a felt form, if necessary, followed by entangling in a conventional procedure such as needle-punching.

The adsorptive sheet layer usually has a weight of about 20 to 2,000 g/m$^2$, a pack density of about 0.03 to 0.10 g/cm$^3$ and a thickness of about 0.5 to 50 mm, and preferably has a weight of about 50 to 500 g/m$^2$, a pack density of about 0.04 to 0.06 g/cm$^3$ and a thickness of about 2 to 10 mm.

On at least one surface of the adsorptive sheet layer, a reinforcing sheet layer is provided. The reinforcing sheet layer may be made of any organic and/or inorganic fibers such as polyester fibers, polyamide fibers, polypropylene fibers, rayon fibers, glass fibers, asbestos fibers, rock wool fibers and slug wool fibers. It may be a permeable woven or non-woven one but should have a weight of about 20 to 2,000 g/m$^2$. The fibers for construction of the reinforcing sheet layer should have a single yarn strength of not less than about 2 g/denier and an elongation of not less than about 2%.

The reinforcing sheet layer usually has a weight of about 20 to 1,000 g/m$^2$, a pack density of about 0.03 to 0.10 g/cm$^3$ and a thickness of about 0.2 to 50 mm and preferably has a weight of about 50 to 500 g/m$^2$, a pack density of about 0.04 to 0.06 g/m$^3$ and a thickness of about 2 to 10 mm. Moreover, the reinforcing sheet layer is favored to have a dust collection efficiency of not less than about 40%, particularly of not less than about 60%.

The term "dust collection efficiency" as hereinabove used is intended to represent the value determined by the method as described in JIS (Japanese Industrial Standard) B9907-(1966). When this value is not higher than about 40%, the adsorbing capacity of the adsorptive sheet layer in the adsorptive filter material may be lost within a relatively short period of time.

For preparation of the adsorptive filter material, the adsorptive sheet layer and the reinforcing sheet layer may be simply piled up or entangled by any conventional procedure such as needle-punching. In case of needle-punching, it may be made with about 5 to 100 penetrations/cm$^2$. In an alternative, the adsorptive filter material may be prepared by providing the reinforcing sheet layer having a self-adhesive property on at least one surface of the adsorptive sheet layer so as to combine them by the self-adhesive property. In another alternative, the adsorptive filter material may be prepared by sewing the reinforcing sheet layer on at least one surface of the adsorptive sheet layer so as to combine them. Still, each of the adsorptive sheet layer and the reinforcing sheet layer may be constituted with one or more sheet layers.

Referring to the accompanying drawings, a perspective view of an embodiment of the adsorptive filter material according to the invention is shown in FIG. 1, wherein (1) is the felt form adsorptive sheet layer which is made of active carbon fibers, and (2) and (3) are respectively the felt form reinforcing sheet layer of a larger thickness and the felt form reinforcing sheet layer of a smaller thickness, both being made of glass fibers.

These layers (3), (1) and (2) are needle-punched therethrough for entanglement. In use, the adsorptive filter material is set or placed in such a manner that the thicker reinforcing sheet layer (2) faces the entering unclean fluid. If the adsorptive filter material has only one reinforcing sheet layer, such layer is placed so as to face the entering unclean fluid.

Figure 2:
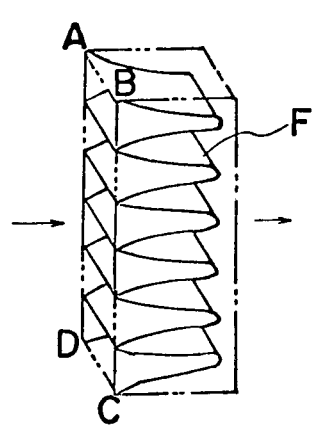

For the practical use of the adsorptive filter material of the present invention, is it usually preferred that the filter be folded in an alternate manner as in FIG. 2. In this case, the folding may be effected in such a manner that the ratio of the maximum distance between one fold and another fold adjacent thereto, to the fold length, is not more than about 178.

Figure 3:
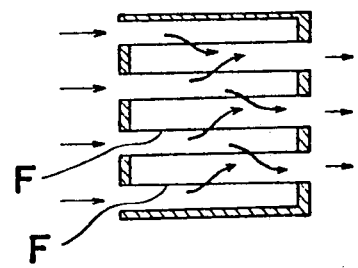

A harmonica form, as illustrated in FIG. 3, is also a preferred embodiment.

Figure 4:
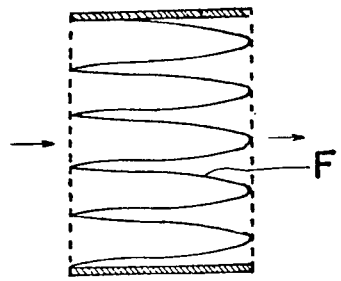

It is also preferred that the adsorptive filter material of the invention be made in a bag form as in FIG. 4. In this case, the total outer surface area of the bag may not be less than about 2 times the maximum opening area.

For preparation of an adsorptive filter unit, the adsorptive filter material may be accommodated or positioned in a frame having a tridimensional form under the conditions that the ratio of the area of the adsorptive filter material to the area of the frame is not less than about 2 and the 0.1 m/sec pressure loss is not more than 15 mm Aq.

The ratio of the area of the adsorptive filter material to the area of the frame represents more specifically the ratio of the total area of the adsorptive filter material facing the entering fluid to the area of one side of the frame, through which the fluid enters.

The conditions as above mentioned are quite effective for maintaining the adsorbing capacity of the adsorptive filter material for a long period of time. In order to satisfy such conditions, the adsorptive filter material may be used in a variety of forms such as an alternately folded form, a harmonica form and a bag form referred to above, which are respectively shown in FIGS. 2 to 4 of the accompanying drawings. In these Figures, the arrow line indicates the direction in which the fluid flows, and (F) is the adsorptive filter material. The area of the frame is intended to mean, for instance, the square ABCD in FIG. 2.

The 0.1 m/sec pressure loss is the difference between the pressure produced by passing air of 20° C. through the adsorptive filter material at a linear velosity of 0.1 m/sec and the pressure before such passing.

A conventional adsorptive filter material constituted with active carbon fibers alone is fragile and readily broken. When used for treatment of a fluid containing a relatively large amount of solid materials (e.g. dusts), the adsorptive sites are readily occupied by the solid materials so that the adsorbing capacity rapidly goes down. The adsorptive filter material of the invention having the construction as illustrated above is reinforced in mechanical strength, and the adsorbing capacity is prevented from deterioration. Since it is made only of fiber materials, the active surface per unit weight is large and the pressure loss is small. Thus, it is quite suitable for treatment of gaseous or liquid fluids.

Practical and presently preferred embodiments of this invention are illustratively shown in the following Examples wherein measurements are made in the following manners:

1. Felt strength

Break strength was measured on a specimen of 1 cm wide and 10 cm long by the use of an Instron type tensile machine.

2. Equilibrated adsorption amount of benzene

The equilibrated adsorption amount of benzene per 1 $m^2$ of a specimen (200 g of active carbon fibers) in case of air containing about 1500 ppm of benzene being passed through was measured.

3. Life to dust

Air containing 8 kinds of loam powders was sent through a specimen at a rate of 10 cm/sec, and the time until a remarkable increase of pressure loss was recognized was determined.

EXAMPLE 1

A sheet of non-woven fabric made of polynosic regenerated cellulose fibers was heated at 300° C. for 60 minutes and then heated at 900° C. in the presence of steam for 30 minutes to give a sheet of non-woven fabric of active carbon fibers having an adsorbing capacity and having a weight of 200 g/$m^2$. On each surface of the sheet of non-woven fabric of active fibers, a sheet of non-woven fabric made of polyester fibers and having a weight of 70 g/$m^2$ was piled up, and the piled product was needle-punched with 40 penetrations/$cm^2$ to give an adsorptive filter material.

The characteristics of the thus obtained adsorbed filter material are shown in Table 1, wherein those of a sheet of non-woven fabric of active carbon fibers without any sheet of non-woven fabric of polyester fibers are also shown.

Table 1

|  | Adsorptive filter material | Sheet of non-woven fabric of active carbon fibers |
|---|---|---|
| Weight (g/$m^2$) | 340 | 200 |
| Thickness (mm) | 7 | 6 |
| Packing density (g/$cm^3$) | 0.045 | 0.040 |
| Felt strength (kg/cm wide) | 2.3 | 0.2 |
| Equilibrated adsorption amount of benzene (g/$m^2$) | 100 | 100 |
| Life to dust (hrs) | 1000 | 500 |

EXAMPLE 2

On one surface of a sheet of non-woven fabric of active carbon fibers obtained as in Example 1, a sheet of non-woven fabric of glass fibers having a weight of 100 g/$m^2$ was piled up, and a sheet of non-woven fabric of polyester fibers having a weight of 70 g/$m^2$ was piled up on the other surface. The piled product was needle-punched with 15 penetrations/$cm^2$ to give an adsorptive filter material.

The characteristics of the thus obtained adsorbed filter material are shown in Table 2.

Table 2

|  | Adsorptive filter material |
|---|---|
| Weight (g/$m^2$) | 370 |
| Thickness (mm) | 8 |
| Felt strength (kg/cm wide) | 1.5 |
| Elimination per- | 95 |

Table 2-continued

| | Adsorptive filter material |
|---|---|
| centage of smoke and smell of tobacco (%) | |

EXAMPLE 3

A tow of rayon fibers was heated at 850° C. to give a tow of active carbon fibers having an equilibrated adsorption amount of benzene of 55%. The tow was cut by the aid of a cutter to give short fibers having an average size of 3 mm. Separately, hydroxyethylated polynosic rayon fibers were cut to a size of 3 mm long and dispersed into water. The dispersion containing 1 part by weight of the hydroxyethylated polynosic rayon fibers was admixed uniformly with 0.5 part by weight of the active carbon fibers, and the mixture was poured onto a screen to make a paper. Three sheets of the paper thus prepared were piled up, and a sheet of non-woven fabric of rayon fibers having a weight of 30 g/m² was piled up on each surface of the piled paper product. The resulting piled product was treated with water and pressed by the aid of a calender to make an adsorptive filter material.

The characteristics of the thus obtained adsorptive filter material are shown in Table 3, wherein those of a piled product consisting of 3 sheets of the paper as above prepared are also shown.

Table 3

| | Adsorptive filter material | Paper (3 sheets) |
|---|---|---|
| Weight (g/m²) | 210 | 150 |
| Thickness (mm) | 5 | 4.5 |
| Felt strength (kg/cm wide) | 2.5 | 0.8 |
| Equilibrated adsorption amount of benzene (g/m²) | 50 | 50 |
| Life to dust (hrs) | 700 | 200 |

EXAMPLE 4

The adsorptive filter material obtained as in Example 1 was sewed to made a bag having an area of entrance (as a round) of 0.1 m² and a total outside area of 2 m². Into the entrance of the bag, air containing 1 ppm of ozone was flowed at a rate of 21 m³/min to give a pressure loss of 4.1 mm Aq., an elimination efficiency of ozone of 97% and a time for breaking of 350 hours. When a sheet of the adsorptive filter material in a flat form having an area corresponding to the said entrance area was used, the pressure loss, the elimination efficiency of ozone and the time for breaking were respectively 82 mm Aq., 80% and 17 hours. When a sheet made of active carbon filters alone was used, sewing to make a bag was impossible.

What is claimed is:

1. An adsorptive filter material which comprises an adsorptive sheet layer of active carbon fibers having a thickness of about 0.5 to 20 mm and an active carbon fiber content of not less than 20% by weight, said active carbon fibers having an adsorption rate constant of benzene of not less than about 0.2 per minute, and reinforcing sheet layers of non-woven fabric provided on both surfaces of the adsorptive sheet layer, said reinforcing sheet layers having a pack density of about 0.03 to 0.10 g/cm³ and a thickness of about 0.5 to 20 mm, the fibers of said non-woven fabric having a single yarn strength of not less than about 2 g/denier and an elongation of not less than about 2%, the adsorptive sheet layer and the reinforcing sheet layers being needle-punched and each weighing from about 20 to 2,000 g/m².

2. An adsorptive filter unit, which comprises a frame having a tridimensional form and a folded product of the adsorptive filter material according to claim 1 positioned in the frame under the condition that the ratio of the area of the adsorptive filter material to the area of the frame is not less than about 2 and the 0.1 m/sec pressure loss is not more than 15 mm Aq.

3. The adsorptive filter material according to claim 1, wherein the adsorptive sheet layer is of non-woven fabric.

4. The adsorptive filter material according to claim 1, wherein each reinforcing sheet layer has a dust collection efficiency of not less than about 40%.

5. The adsorptive filter material according to claim 1, wherein the needle-punching is effected with about 5 to 100 penetrations/cm².

6. The adsorptive filter material according to claim 1, wherein the active carbon fibers in the adsorptive sheet layer have an equilibrated adsorption amount of benzene of not less than about 300 mg/g.

7. A bag made of the adsorptive filter material according to claim 1, of which the total outer surface area is not less than about 2 times the maximum opening area.

8. The adsorptive filter material according to claim 1, wherein the fibers of the reinforcing sheet layers are organic fibers.

9. The adsorptive filter material according to claim 8, wherein said fibers are selected from at least one member of the group consisting of polyester fibers, polyamide fibers, polypropylene fibers and rayon fibers.

10. The adsorptive filter material according to claim 1, wherein the fibers of the reinforcing sheet layers are inorganic fibers.

11. The adsorptive filter material according to claim 10, wherein said fibers are selected from at least one member of the group consisting of glass fibers, asbestos fibers, rock wool fibers and slug wool fibers.

12. The adsorptive filter material according to claim 1, wherein the adsorptive sheet layer has a weight of about 30 to 1,000 g/m² and a pack density of about 0.03 to 0.10 g/cm³.

13. The adsorptive filter material according to claim 12, wherein the adsorptive sheet layer has a weight of about 50 to 500 g/m², a pack density of about 0.04 to 0.06 g/cm³ and a thickness of about 2 to 10 mm.

14. The adsorptive filter material according to claim 1, wherein each reinforcing sheet layer has a weight of about 20 to 1,000 g/m².

15. The adsorptive filter material according to claim 14, wherein each reinforcing sheet layer has a weight of about 50 to 500 g/m², a pack density of about 0.04 to 0.06 g/cm³ and a thickness of about 2 to 10 mm.

16. The adsorptive filter material according to claim 1, wherein the adsorptive sheet layer comprises a felt.

17. The adsorptive filter material according to claim 16, wherein reinforcing sheet layers having a self-adhesive property are provided on both surfaces of the adsorptive sheet layer so as to combine them by the self-adhesive property in combination with needle-punching.

18. The adsorptive filter material according to claim 1, which is folded in an alternate manner.

19. The adsorptive filter material according to claim 18, wherein the ratio of the maximum distance between one fold and another fold adjacent thereto to the fold length is not more than about ½.

* * * * *